US012035712B2

(12) United States Patent
Farina et al.

(10) Patent No.: US 12,035,712 B2
(45) Date of Patent: Jul. 16, 2024

(54) METHOD FOR PROMOTING TARGETED POLLINATION OF PEAR TREE CROPS IN HONEY BEES

(71) Applicants: CONSEJO NACIONAL DE INVESTIGACIONES CIENTÍFICAS Y TÉCNICAS (CONICET), Ciudad Autónoma de Buenos Aires (AR); UNIVERSIDAD DE BUENOS AIRES, Ciudad Autónoma de Buenos Aires (AR)

(72) Inventors: Walter M. Farina, Ciudad Autónoma de Buenos Aires (AR); Paula Carolina Díaz, Puerto Iguazú (AR)

(73) Assignees: CONSEJO NACIONAL DE INVESTIGACIONES CIENTÍFICAS Y TÉCNICAS (CONICET), Ciudad Autónoma de Buenos Aires (AR); UNIVERSIDAD DE BUENOS AIRES, Ciudad Autónoma de Buenos Aires (AR)

( * ) Notice: Subject to any disclaimer, the term of this patent is extended or adjusted under 35 U.S.C. 154(b) by 0 days.

(21) Appl. No.: 18/317,463

(22) Filed: May 15, 2023

(65) Prior Publication Data
US 2023/0276796 A1   Sep. 7, 2023

Related U.S. Application Data

(62) Division of application No. 16/634,077, filed as application No. PCT/IB2018/055550 on Jul. 25, 2018, now Pat. No. 11,690,376.

(30) Foreign Application Priority Data

Jul. 26, 2017 (AR) .............................. 20170102102

(51) Int. Cl.
A01N 31/02  (2006.01)
A01N 27/00  (2006.01)
A23K 20/105 (2016.01)
A23K 20/163 (2016.01)
A23K 50/90  (2016.01)

(52) U.S. Cl.
CPC ............. *A01N 31/02* (2013.01); *A01N 27/00* (2013.01); *A23K 20/105* (2016.05); *A23K 20/163* (2016.05); *A23K 50/90* (2016.05)

(58) Field of Classification Search
CPC ........ A01N 31/02; A01N 27/00; A01N 31/04; A23K 20/105; A23K 20/163; A23K 10/30; A23K 50/90
See application file for complete search history.

(56) References Cited

U.S. PATENT DOCUMENTS

2009/0099135 A1* 4/2009 Enan ...................... A01N 65/00
514/122

* cited by examiner

*Primary Examiner* — Trevor Love
(74) *Attorney, Agent, or Firm* — Muncy, Geissler, Olds & Lowe, P.C.

(57) ABSTRACT

A formulation and a composition that comprises it for promoting the pollination of pear crops (*Pyrus*) by biasing the foraging preferences of the honey bee (*Apis mellifera*). The formulation comprises the compounds limonene, linalool and α-pinene. Additionally, a method for targeting the bees' pollination activity towards the pear crops by using the formulation comprising the compounds limonene, linalool and α-pinene.

8 Claims, 5 Drawing Sheets

METHOD FOR PROMOTING TARGETED POLLINATION OF PEAR TREE CROPS IN HONEY BEES

CROSS REFERENCE TO RELATED APPLICATIONS

This application is a Divisional of co-pending application Ser. No. 16/634,077, filed on 24 Jan. 2020, which is a national stage application of PCT Application No. PCT/IB2018/055550 filed on 25 Jul. 2018, for which priority is claimed under 35 U.S.C. § 120, which claims priority of Application No. 20170102102 filed in Argentina on 26 Jul. 2017 under 35 U.S.C. § 119, the entire contents of all of which are hereby incorporated by reference.

The present disclosure relates to a formulation and compound that promote the pollination of pear tree crops (*Pyrus* sp.) by biasing the foraging preferences of the honey bee (*Apis mellifera*). It also relates to a method for targeting the pollination activity of the bees towards pear tree crops.

BACKGROUND OF THE INVENTION

Among honey bees, odors play an important role in the search and selection of their nourishment sources. It is widely known that bees control the collection of resources not only according to innate search images, but also according to experiences previously acquired in the field as well as in the social environment of the hive (Ribbands C R (1955) *The scent language of honey bees; Ann Rev Smithson Inst* 368-377; von Frisch K (1967) *The dance language and orientation of bees*; Harvard University Press. Cambridge, MA). In this sense, the olfactory memories established in the field based on floral odors and their nectar may be retrieved (evoked) with the presence of this floral scent inside the hive (Ribbands C R (1954) *Communication between honeybees; the response of crop-attached bees to the scent of their crop; Proc R Entomol Soc Lond A* 29:141-144; Johnson D L & Wenner A M (1966) *A relationship between conditioning and communication in honeybees; Anim Behav* 14:261-265; Jakobsen H B & col., (1995) *Can social bees be influenced to choose a specific feeding station by adding the scent of the station to the hive air? J Chem Ecol* 21(11):1635-1648; Reinhard J & col., (2004) *Floral scents induce recall of navigational and visual memories in honeybees. J Exp Biol* 207:4371-4381). Furthermore, the consumption of scented food retrieved by foragers and brought into the hive can produce a bias in the collecting preferences of their nestmates (von Frisch K (1923) *Über die Sprache der Bienen; Zool Jb Physiol* 40:1-186; Wenner A M & col. (1969) *Honey bee recruitment to food sources: olfaction or language? Science* 164:84-86; Dornhaus A, Chittka L (1999) *Evolutionary origins of bee dances; Nature* 401:38).

During foraging in scented feeding stations, hive members may learn these odors if they remain impregnated in the foragers' bodies (von Frisch K (1967) *The dance language and orientation of bees*; Harvard University) and/or if small samples of scented food are transferred mouth-to-mouth between hive members (trophallaxis) (Farina, W M & col. (2007) *Honeybees learn floral odors while receiving nectar from foragers within the hive; Naturwissenschaften*, 94:55-60).

Furthermore, it has been demonstrated that scented food retrieved by foragers and moved around the hive may affect the behavior of young bees that are not yet involved in foraging tasks (Goyret J & Farina W M (2005) *Non-random nectar unloading interactions between foragers and their receivers in the honeybee hive. Naturwissenschaften*, 92:440-443; Grater C & col. (2006) *Propagation of olfactory information within the honeybee hive. Behav Ecol Sociobiol* 60:707-71; Grater C & col. (2009). *Retention of long-term memories in different age-groups of honeybee (Apis mellifera) workers. Insectes Sociaux.* DOI 10.1007/s00040-009-0034-0).

The inventors of the present disclosure have previously published results suggesting that bees may develop olfactory memories inside the hive during the distribution of scented food. Such memories may be retrieved (evoked) days after the fact and outside the hive, which is evidenced by the bias in the foraging preferences. The establishment of these memories depends on neither the recruiting mechanisms commonly found in hives, nor on the presence of scented food reserves that enable the retrieval of the previously acquired memories (Arenas A & col., (2007). *Floral odor learning within the hive affects honeybees' foraging decisions. Naturwissenschaften*, 94:218-222).

In "*Floral odor learning within the hive affects honeybees' foraging decisions*", published in Naturwissenschaften, 94:218-222, Arenas A & col., it is furthermore disclosed that the odor of food that is available "inside the beehive" produces long-term olfactory memories that affect the behavior for selecting food sources outside the hive. It is also disclosed that, in order to develop long-term memories of a specific floral (pure) odor, such odor should be available while dissolved in a sugar solution (sucrose solution 50% w/w), which can be made available in a feeder located inside the hive (a common procedure used in apiculture). The pure odor should be diluted in the sugar solution in minimal quantities (concentration: 50 µl of odor per 1 L of sugar solution available).

In "*Floral scents affect the distribution of hive bees around dancers*", *Behavioral Ecology and Sociobiology* (2007) 61:1589-1597, Jul. 4, 2007. Diaz, Paula C. & col., it is disclosed that the floral odor impregnated in the body of a bee returning from a flower site attracts nestmates at the time of engaging in the "dance of the bees", a mechanism used by this species to recruit other bees towards food sources inside the hive, besides from increasing the incidence of food samples transfer taking place via mouth-to-mouth contact or trophallaxis.

Lastly, in "*Floral scents experienced within the colony affect long-term foraging preferences in honeybees*", *Apidologie* 39:714-722, 2008. Arenas A & col., it is disclosed that the factor increasing the number of landings on a food source with a specific odor is the odor of the food moving around the hive and not the exposure to that same odorant as volatile. Furthermore, in "*Passive volatile exposure within the honeybee hive and its effect on odor discrimination*". *Journal of Comparative Physiology A*195:759-768, 2009. Fernández V & col., it is disclosed that the exposure to a floral odor as volatile "inside the hive" hinders learning of those floral odors in subsequent trainings. This suggests that those odors exposed as volatilized compounds inside the hive will not be preferred if they are present in a natural floral fragrance, even when specific flowers offer abundant nectar as resource.

Many crops require pollination by insects that favor cross-fertilization by visiting different flowers of the same species. Particularly, *Apis mellifera* is the most abundant pollinator in single-crop farming around the world, and is considered to be of very high importance to increase the yield of seed and fruit.

In some countries leading the world ranking in honey production, as is the case of Argentina, apiculture is essentially understood as a means to obtain the produce stockpiled in the beehive (honey, propolis or bee glue, and royal jelly, etc.). Nonetheless, the use of the honey bee as a crop pollinizing agent is generally somewhat underdeveloped in comparison with other countries where it enjoys a greater importance, i.e. the United States and France. Nevertheless, in parallel with the advances in monocultures or single-crop farming, a growing demand arises in search of increasing targeted and sustainable pollination services for these crops.

The main problem to be addressed in targeted pollination relates to the change in floral availability when displacing hives from one environment which is familiar to the foragers to another, unfamiliar location. In an unfamiliar environment, honey bees lack any reliable and updated information that can be evoked during foraging.

In practice, it is observed that after transhumance (beehive displacement) the foragers remain relatively idle during the first days, and do not immediately visit the desired flowers, even when these offer substantial rewards. This occurs due to the fact that the recently introduced bees lack previous experiences related to the target crop; thus, nor previously established memories exist to guide or enable localization of this floral species. During a variable period (that can carry on for several days) the bees develop new scent-nectar associations (memories) and update the information that allows them to locate new floral species available in the environment.

Two products available in the market, POLLINUS® and BEE SCENT®, are similar to a bee pheromone and their presence on floral sites attracts new honey bees. Their use involves spraying of a crop (whatever its type) with the product, which can be efficient in reduced spaces (such as little orchards and greenhouses) but not over wide field surfaces. This would require several product sprayings, which would render the practice overly costly and hardly efficient for extensive crops. While these products act directly as bee attractants (although they might as well attract other insects), they lack specificity for a particular floral species, and due to their nature, they could interfere directly with other behaviors of the bees. None of these products is based on floral odors linked to appetite nor do they involve the bees' olfactory memory.

Patent application CN102823628 (A) discloses a composition to attract bees to soy crops and its method of use, wherein the attracting composition is sprayed over the soy crop to promote its pollination, and therefore increase production.

An alternative strategy is to "train" the bees so that they acquire a preference to collect pollen from a particular species of flower, in order to promote its pollination. This strategy was implemented in the '30s by beekeepers of Germany and ex-USSR countries, who used this method to stimulate beehives with natural scents, particularly by grinding flowers [(von Frisch, K. (1943), Versuche uber die Lenkung des Bienenfluges durch Duftstoffe. Naturwissenschaften 31, 445-460]. The disadvantage of this methodology is that industrial scale production of scents via this procedure is not efficient, and requires the destruction of flowers belonging to the target species. Moreover, scents produced via the grinding of flowers are unstable and do not easily resist storage.

Patent application CN101569286 (A) discloses compositions and methods to promote pollination by bees of sterile plant parental lines. The composition comprises secondary metabolites of flowers such as common alkaloids (i.e. nicotine and caffeine) and water-soluble phenols (i.e. flavonoids, quercetin, gallic acid and caffeic acid). The method consists of placing the beehives inside tents where target plants grow. The bees are then fed with the composition that comprises the secondary metabolites in a certain timeline, and feeding continues until flowering stage ends, at which point the bees are removed from the tent. This method and composition are not targeted to any particular plant species, and are not useful for crops in large-scale farming, such as the pear tree.

Patent application JP2008212148 "Method for promoting pollination of plant including induction of flower bee to floral organ of specific plant by taking advantage of floral fragrance component of flower organ of this plant" describes a composition of floral fragrances to promote pollination of plants by bees. Nonetheless, this patent application does not describe a composition that simulates the pear tree floral odor in a specific manner, nor that is useful to target the bees' pollination activity towards pear tree crops. Neither can a compound of such characteristics be derived from the disclosures of application JP2008212148.

Patent application WO2013005200 (A1) discloses a composition to promote pollination of apple crops (*Malus silvestris*) by causing a bias in the honey bees' foraging preferences, and its method of use. The composition comprises the compounds citral, α-pinene and limonene. By being specific to apple crops, the composition is not useful to promote pollination of pear tree crops.

Patent application WO2013005199 (A1) discloses a composition to promote pollination of sunflower crops (*Helianthus annuus*) by causing a bias in the honey bees' foraging preferences. The composition comprises the compounds sabinene, f-pinene and limonene. By being specific to sunflower crops, the composition is not useful to promote pollination of pear tree crops.

Therefore, the need arises for effective and stable compositions that promote pollination of pear tree crops, and can also be produced in a simple and cost-effective manner, on an industrial scale, as well as methods for promoting the pollination of pear tree crops by the honey bee (*Apis mellifera*).

BRIEF DESCRIPTION OF THE INVENTION

It is therefore an object of the present disclosure to provide compositions that simulate the pear tree floral odor in order to generate specific olfactory memories in bees from hives that shall be located in pear tree crops to promote their pollination. The memories established after stimulation with the present formulation decrease the time during which bees remain idle until the beginning of foraging. The composition of the invention stimulates collection of resources by promoting a faster and constant foraging activity on the crop. The use of the invention decreases the time needed for the beehives to remain in the crops, as well as the number of required beehives. Additionally, the use of the composition improves the health conditions in the beehives and increases their population. On the other hand, the composition of the invention has a very low cost and does not require the use of sophisticated techniques for its implementation.

According to a first aspect, the present invention relates to a formulation for promoting the targeted pollination of pear tree crops by honey bees, comprising the compounds limonene, linalool and α-pinene.

In one particular embodiment, the formulation of the invention comprises 21.6% to 26.4% limonene, 31.5% to 38.5% linalool, and 36.9% to 45.6% α-pinene, and more particularly 24% limonene, 35% linalool and 41% de α-pinene.

According to another aspect, the present invention provides a composition for promoting the targeted pollination of pear tree crops by honey bees, comprising the formulation of the invention diluted in a sugar solution.

In a preferred embodiment of the composition of the invention, the sugar solution is an aqueous sucrose solution, more preferably a 50% w/w sucrose solution. In a more specific embodiment, the composition of the invention comprises 0.1 ml to 0.2 ml of the formulation according to the invention per 1 L of 50% w/w aqueous sucrose solution. In an even further specific embodiment, the composition of the invention comprises 0.1 ml to 0.2 ml of a formulation comprising 24% limonene, 35% linalool and 41% α-pinene per 1 L of 50% w/w aqueous sucrose solution.

According to another further aspect, the present invention provides a method for promoting the targeted pollination of pear crops by honey bees, comprising the following steps:
 a) administering the composition of the invention to the beehives;
 b) keeping the beehives in or in the immediate vicinity of the pear tree crops, whose pollination can be promoted until the end of flowering; and
 c) removing the beehives.

According to a particular embodiment of the method of the invention, step a) is executed via an artificial feeder located inside the beehive.

According to another particular embodiment of the method of the invention, step a) takes place within 2 days before placing the beehives in the crops, the pollination of which is sought to be promoted.

According to an additional particular embodiment of the method of the invention, step a) is executed after the placement of the beehives in the crops, the pollination of which is sought to be promoted.

According to an additional particular embodiment of the method of the invention, step a) is executed before the crop's flowering level reaches 20%.

According to an additional particular embodiment of the method of the invention, the composition is administered to the beehives a second time during step b).

DETAILED DESCRIPTION OF THE INVENTION

Figure 1:
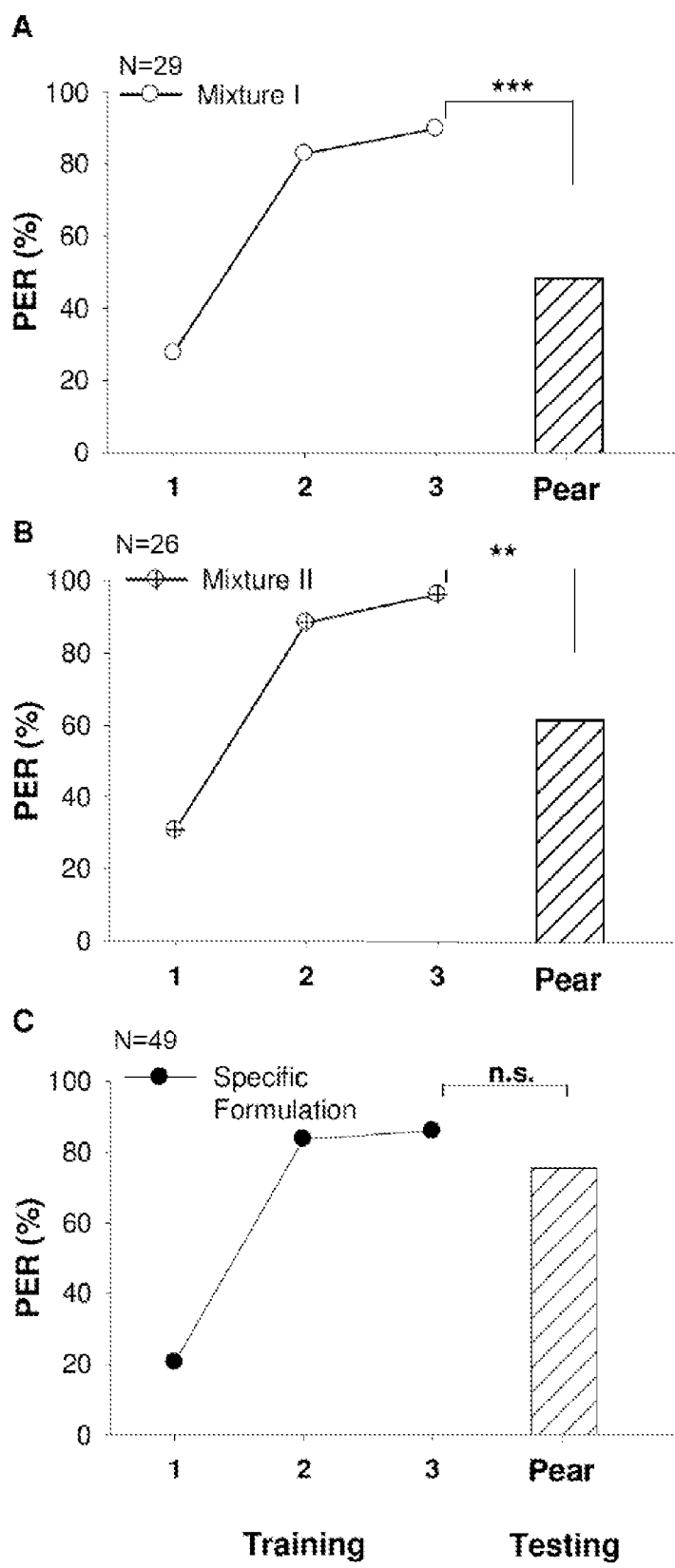
FIG. 1. Bees' ability to differentiate the pear tree natural floral odor from different scents in the proboscis extension response (PER) setup. A-C: Bees' behavior upon exposure to the pear tree natural floral odor vs.: A, Formulation I; B, Formulation II; C, the Formulation of the Invention (Formulation). The left panel shows the acquisition curves during training, while the right panel shows later evaluations. The size of the sample is indicated in the left panel. Asterisks indicate significant differences, *, $p<0.001$; $p<0.01$; n/s, $p>0.05$ (Fisher's exact test).

In recent years, pollination of pear crops using honey bee hives has gained significant relevance due to the greater increases in the resulting fruit yield.

The presence of honey bee hives in the vicinity of pear trees since the beginning of the flowering stage causes a greater number of fertilized flowers, and therefore a greater fruit setting, which in turn derived in a greater number of harvested fruits. Furthermore, the resulting fruits are greater in size and containing a higher number of seeds, parameters linked with a better quality of the pears of different varieties that are exported as superior-level produce around the world.

For these reasons, pear producers hire pollination services from apiarists specialized in beehive transhumance, renting a certain number of hives during blooming period. In this context, and due to the fact that apiarists usually stimulate their hives with sugar solutions, the application of a composition containing an pear floral synthetic formulation does not represent a significant modification in the usual beekeeping practices. When beekeepers relocate their hives during this period, bees from these colonies show delays before starting to visit novel flowers. As a consequence, being able to develop "memories of a synthetic formulation that simulates the pear fragrance" inside the beehives would enable a reduction in such delay besides from making pollination more efficient.

It is therefore an object of the present invention to provide a formulation that simulates the pear natural floral odor in order to cause bees to immediately start foraging on pear crops. Such formulation comprises the compounds limonene, linalool and α-pinene. Particularly, this formulation acts by increasing the bees' foraging activity, attracting them specifically to pear flowers, promoting pollination and, as a result, increasing the crops' yield.

The inventors have further determined the optimal proportions for the components of the formulation of the invention. Nonetheless, the expert in the field shall note that these values may vary within certain margins without decreasing their efficiency, preferably in approximately +/−10% of their relative percentage. Particularly, the formulation of the invention that that simulates the pear tree floral odor comprises 21.6% to 26.4% limonene, 31.5% to 38.5% linalool, and 36.9 to 45.6% α-pinene. Preferably, the formulation of the invention that that simulates the pear tree floral odor comprises 24% limonene, 35% linalool, and 41% α-pinene. Additionally, according to the present application the terms "limonene", "linalool" and "α-pinene" comprise said compounds per se as well as their derivatives, polymorphs, hydrates, solvates, enantiomers, etc.

Surprisingly, the inventors have found that although the formulation of the invention combines only three out of the 24 volatile compounds identified in the pear tree floral extract (Baraldi et al. 1999. *Volatile organic compound emissions from flowers of the most occurring and economically important species of fruit trees. Phys. Chem. Earth B.* 24, 6, 729-732; see Example 1), bees cannot differentiate the scent of the natural flower from the formulation of the invention, even though the relative abundance of each of the compounds in the formulation of the invention differ significantly from their relative percentage in the pear natural floral fragrance.

Even more surprisingly, the formulation of the invention shows a better performance than other volatile compounds combination present in the pear flowers that were expected a priori to show better results. In fact, as demonstrated in Example 2, the formulation of the invention has a better performance than similar formulations.

Additionally, the field tests show as well that beehives fed with a composition comprising the formulation of the invention, which is also an object of the present application, begin foraging activity earlier and in a more prolonged manner than control hives.

According to the method of the invention, the formulate of the invention can be added to the beehive before or during the hive's placement in the pear crops, using common methodologies already known to apiarists. The invention's formulation can be introduced in the beehive as part of a composition, which is also an object of the present application, wherein the formulation is diluted in a concentration of 0.1 to 0.2 ml per 1 L of 50% w/w aqueous sugar solution (e.g. sucrose solution). Even more preferably, the composition of the invention comprises 0.1 to 0.2 ml of a formulation comprising 24% limonene, 35% linalool and 41% α-pinene, diluted in a 50% w/w sucrose solution. The composition of the invention promotes pollination of pear crops by honey bees.

For the purposes of the present invention, the abbreviation "w/w" refers to the relation between the solute weight and the total solution weight.

As to the way of administering it to the beehive, the formulation (i.e. as a part of a composition as described) can be placed via an artificial feeder inside the hive, or directly by pouring 500 to 1000 ml of the sugar composition over the beehive frames. Eventually, a second administration can be done depending on the state of the beehives and the crops, particularly when the blooming is very prolonged.

The addition of the formulation of the invention, combined with sugar syrup before or during the placement of the beehives in the pear tree crops promotes quick and sustained foraging activity over the target crop, as well as an increased in foraging activity. This simple stimulation method enables the pollination of the pear crop and requires less time for pollination and a smaller number of beehives to be used. On the other hand, the formulation of the invention has a low production and commercialization costs.

In contrast to commercial products POLLINUS® and BEE SCENT®, which generate innate responses in the behavior of the bees (which can be counterproductive in many cases), the formulation of the invention does not such "rigid" responses over the bee's behavior. On the contrary, it influences over the decision-making processes that are adaptable and can be adjusted according to the needs of each beehive or to the changing environment conditions. This proves to be essential when attempting to carry out integrated apicultural and agricultural management without damage for any of the parties involved.

Therefore, the formulation of the invention can be used in small amounts to stimulate the beehives. Moreover, it is a simple formulation, comprising only three of the many volatile compounds that constitute the pear tree floral fragrance, resulting in a cost-effective product, which is simple to manufacture and easy to use. Moreover, the formulation stimulates the immediate foraging of honey bees on pear crops. Stimulation via administering the formulation or the composition of the invention can take place before taking the beehives to the crop or even before the beginning of the pear blooming.

EXAMPLES

Example 1: Preparation of the Formulations

In order to obtain the pear natural floral fragrance used in the following Examples, pear or apple (respectively) buds (flowers that are close to opening their petals or have very recently opened them) were placed in a clean glass container with two orifices that allow the generation of an air current to drag the flowers' volatiles. Said current is delivered to the bees' antennae and is used as a conditioned, non-rewarded stimulus, conditioned rewarded stimulus or testing odor.

3 different formulations were prepared, in each of them the 3 present volatile compounds in the pear tree flower were combined, identified by Baraldi et al. 1999 (Phys. Chem. Earth B 24, 6, 729-732).

The composition of each of the formulations was the following:
  Formulation I: 15% 2-ethylhexanol, 55% linalool, 30% limonene.
  Formulation II: 24% 2-ethylhexanol, 35% linalool, 41% α-pinene.

Formulation III: 24% limonene, 35% linalool, 41% α-pinene.

Example 2: Testing of the Formulations Using Olfactive Conditioning

An absolute olfactory conditioning was executed to evaluate the bees' ability to differentiate the pear tree natural floral odor from other scents. Each bee used in the trial was tied to a harness and presented with the scent in evaluation linked to a reward (Reward-conditioned Stimulus, EC+), and were also presented with the pear tree natural floral odor without a reward (Non Reward-conditioned Stimulus, EC−). The odors were presented in a pseudo-random order. The evaluated scents (EC+) were: A) Formulation I from Example 1 (n=29), B) Formulation II from Example 1 (n=30), and C) Formulation III (Specific Formulation) from Example 1 (n=49). In all cases, non-rewarded control (EC−) was the pear tree natural floral odor obtained as described in Example 1. The ability to differentiate EC+ from EC− was evaluated based on the bees' proboscis extension response (PER).

By the end of the conditioning, the bees were able to differentiate the pear natural flower from Formulation I and II, but were unable to differentiate the pear tree natural floral odor from Formulation III (Specific Formulation; FIG. 1).

Figure 2:
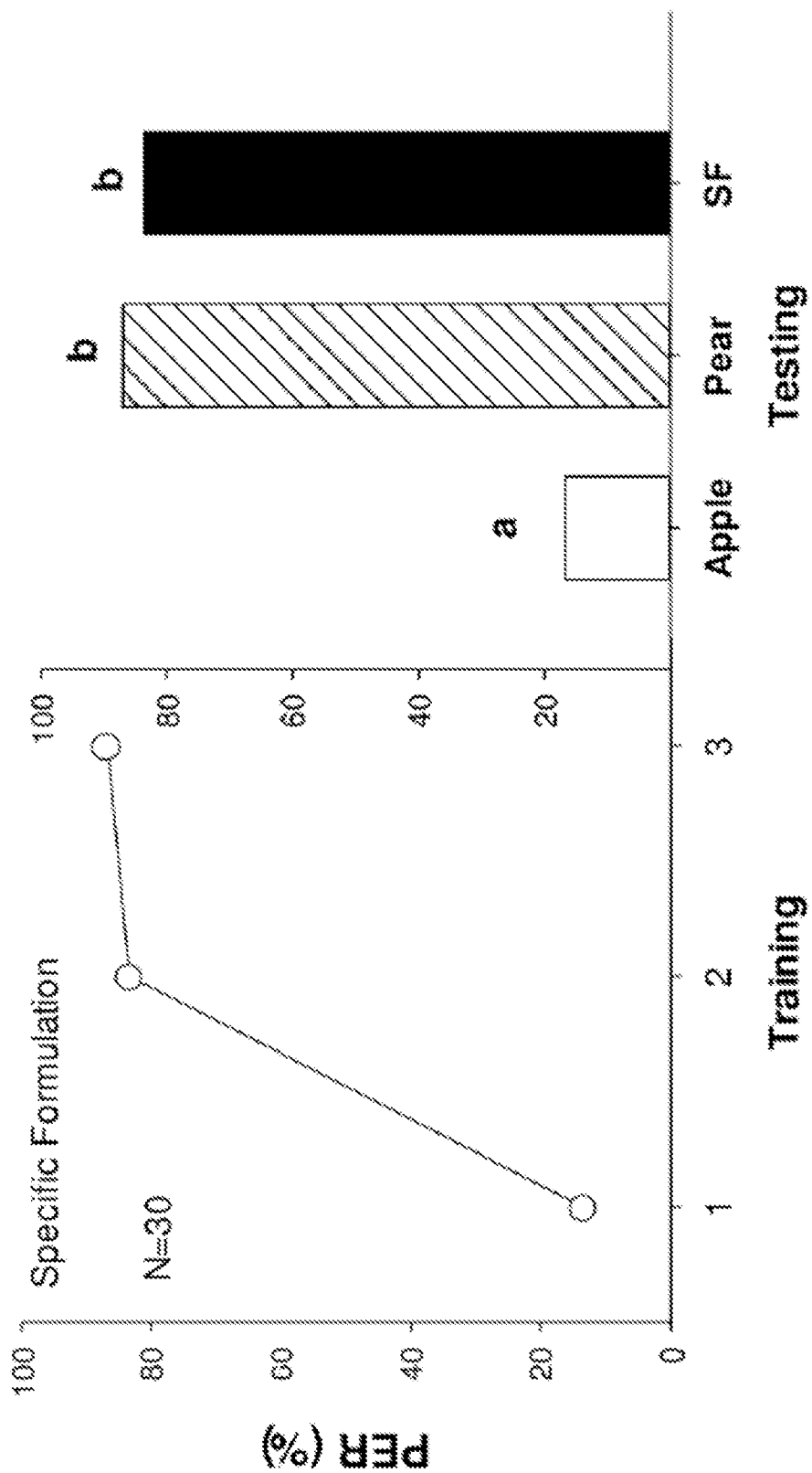
FIG. 2. Bees' ability to differentiate after Absolute Olfactory Conditioning of the proboscis extension response (PER) using the formulation of the invention (Specific Formulation). The left panel shows the acquisition curve during training, measured as the percentage of bees that extended their proboscis (% PER). The right panel shows the tests after the training. The sample size is indicated in the left panel. During the Test, three odors were presented without a reward: the pear flower, the apple flower and the Pear Specific Formulation of the invention (SF). The different letters over the bars indicate significant differences with $p<0.001$ (G Test).

Example 3: Evaluation of Formulations Through Differential Olfactory Conditioning An absolute olfactory conditioning was executed to evaluate the bees' ability to differentiate the pear natural floral odor from the apple floral odor and Formulation III (Specific Formulation). Harnessed bees (n=30) were trained by being presented with Formulation III (Specific Formulation) of example 1 linked to a reward. By the end of the conditioning, the bees were presented with Formulation III (Specific Formulation) and two unfamiliar scents: The apple natural floral odor and the pear natural floral odor, and the bees' proboscis extension response (PER) was evaluated. As it happened in the experiment described in Example 2, the bees conditioned with Formulation III (Specific Formulation), after being presented with the pear tree natural floral odor showed a PER similar to that observed in the last presentation of the conditioning, indicating that they could not differentiate Formulation 3 from the pear natural floral odor, but were in fact able to differentiate Formulation III (Specific Formulation) from the apple natural floral odor (FIG. 2).

Example 4: Beehive Stimulation

A composition was prepared by dissolving 0.1 ml of Formulation 3 from Example 2 per 1000 ml of an aqueous sucrose solution 50% w/w. The formulation of the invention diluted in 500 ml of sucrose solution was fed to 20 beehives through an internal plastic feeder placed inside them. Meanwhile, other 20 hives received 500 ml of non-scented 50% w/w sucrose solution (control) through an internal feeder. In all cases, a single administering was carried out per flowering stage. The hives were located in a pear tree (*Pyrus*) crop not far from General Roca (Rio Negro Province, Argentina). The amount of collected pollen and the hives' population increase were measured. The crops' yield was also evaluated in terms of fruits per tree.

Figure 3:
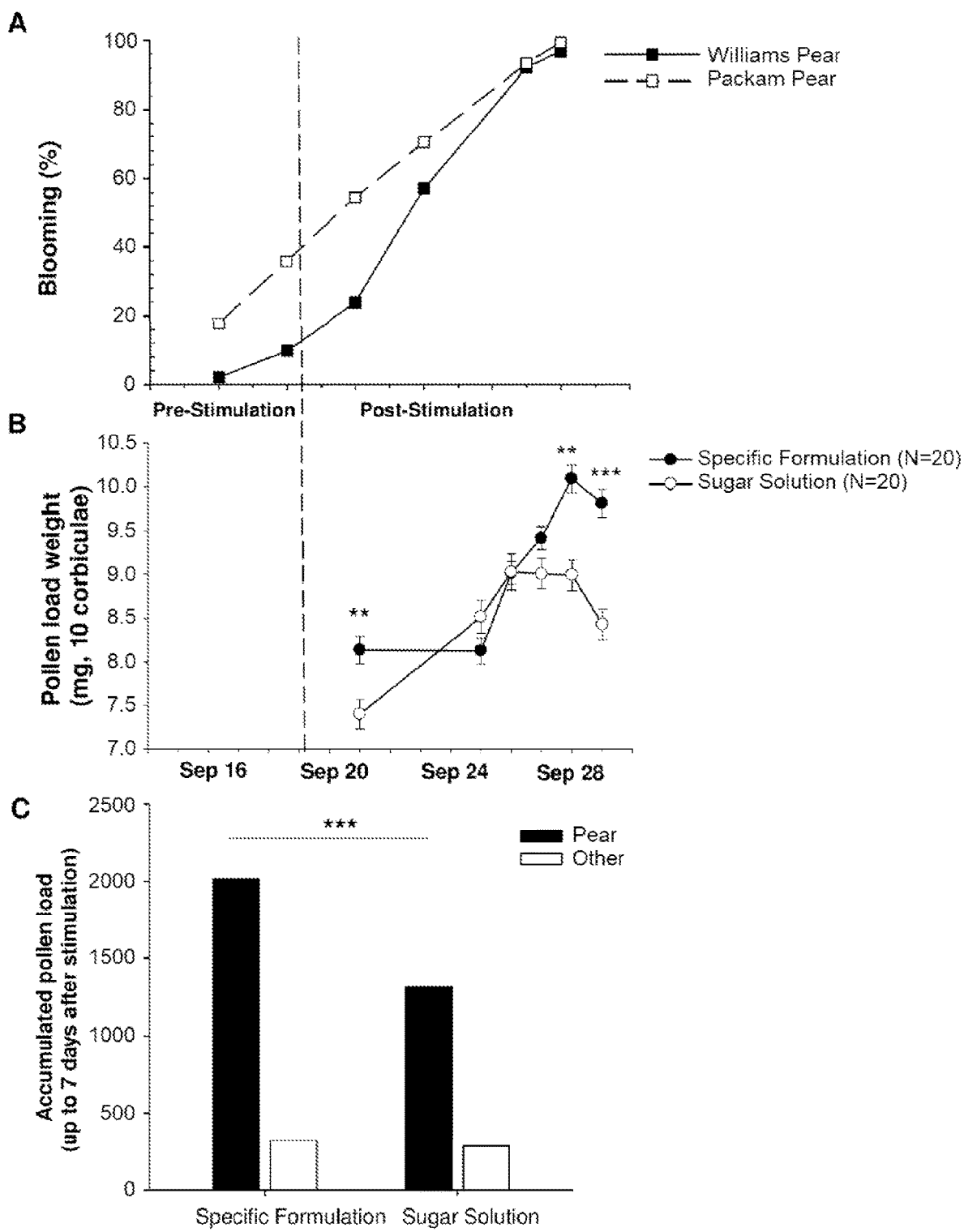
FIG. 3. Effect of the Pear Specific Formulation of the invention on the amount of collected pollen. The figure shows the total pollen collected by bees of different beehives subjected to two treatments during the flowering stage: i) Control Group, beehives fed with 500 ml of Sucrose Solution (white circle) in a single dose; ii) Treatment Group, beehives fed with 500 ml of Sucrose Solution with the addition of the Pear tree Formulation of the invention (Specific Formulation, black circle). A) Percentage of the crop's flowering stage level during the test. B) Weight of 10 corbiculae with pear pollen (mg, median±ES) entering the hives during the flowering period (N=20 weight measurements per treatment). The dotted line indicates the moment the treatments were applied. Asterisks indicate significant differences, , $p<0.01$, *, $p<0.001$ (ANOVA of iterated measurements). C) Pollen loads stored in traps placed in the entrance to the beehives (1 hive per treatment). The samples were classified in pear pollen (black bars) and pollen from other species (white bars). The accrued values during 3 days after applying the treatments are shown. Asterisks indicate significant differences, ***, $p<0.001$ (Chi-squared Homogeneity Test).

The bees from hives fed with the solution scented with Formulation III (Specific Formulation) showed a higher weight of pollen load (FIG. 3B), and a greater amount of pollen loads, explained mainly by a greater amount of pear tree pollen loads in comparison with pollen loads of other species (FIG. 3C).

Figure 4:
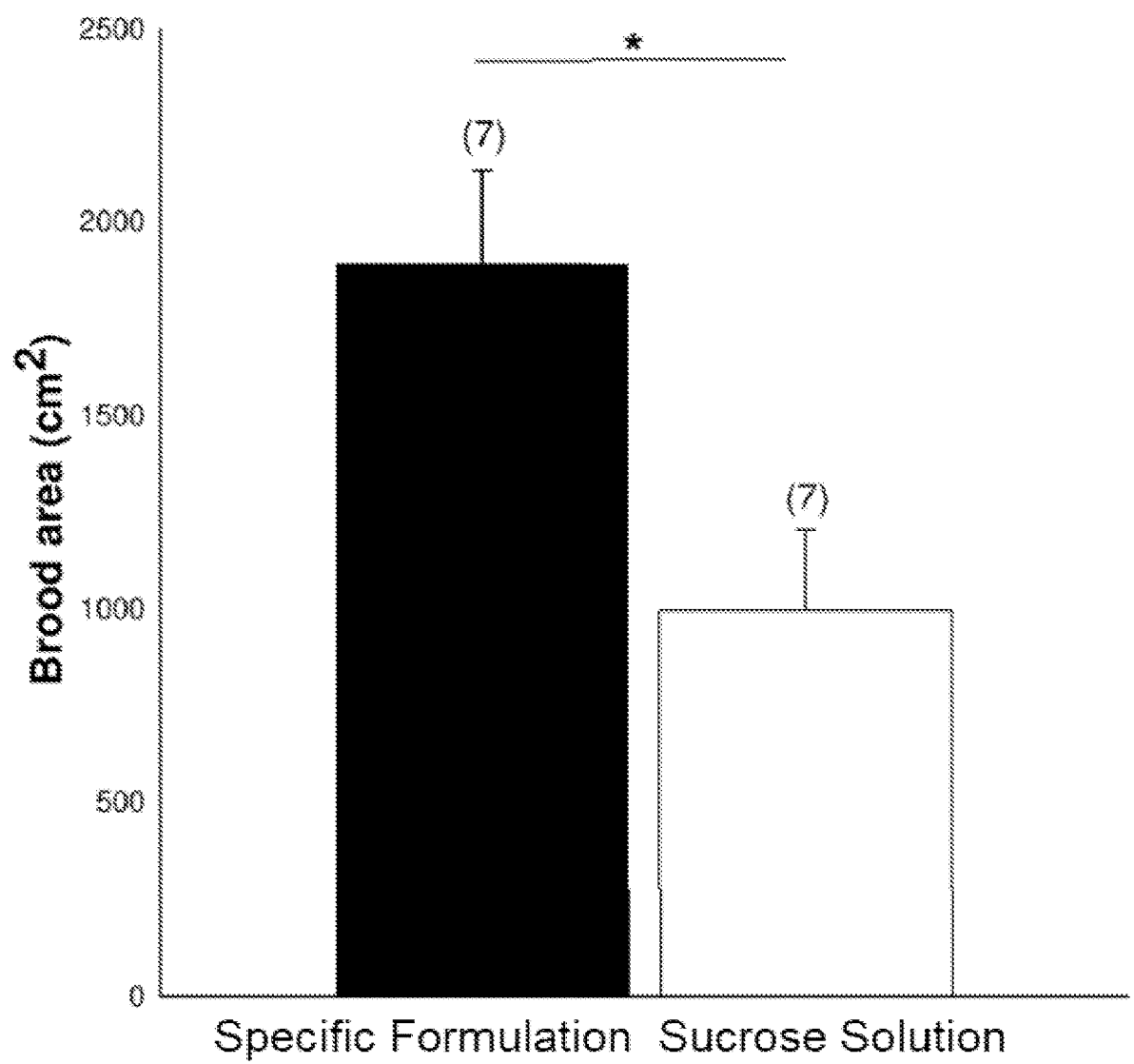
FIG. 4. Brood area growth in beehives subjected to two treatments: i) Control Group, hives fed with 500 ml of Sucrose Solution (white bar, SS) in a single dose; ii) Treatment Group, hives fed with 500 ml of Sucrose Solution with the addition of the Pear tree Specific Formulation of the invention (black bar, EF). The hives' total brood area was estimated based on the sum of the brood areas of both sides in every frame. The number of hives is indicated in brackets. The difference between the initial brood area (measured the day before stimulation) and the final brood area (measured 7 days after) is shown. The asterisk indicates significant differences, *, $p<0.05$ (single factor ANOVA).

The administering of the composition containing Formulation III (Specific Formulation) also resulted in a greater hives' population increase (FIG. 4), showing that the sugar composition with Formulation III (Specific Formulation) promotes a greater food foraging and stimulates hive growth.

Figure 5:
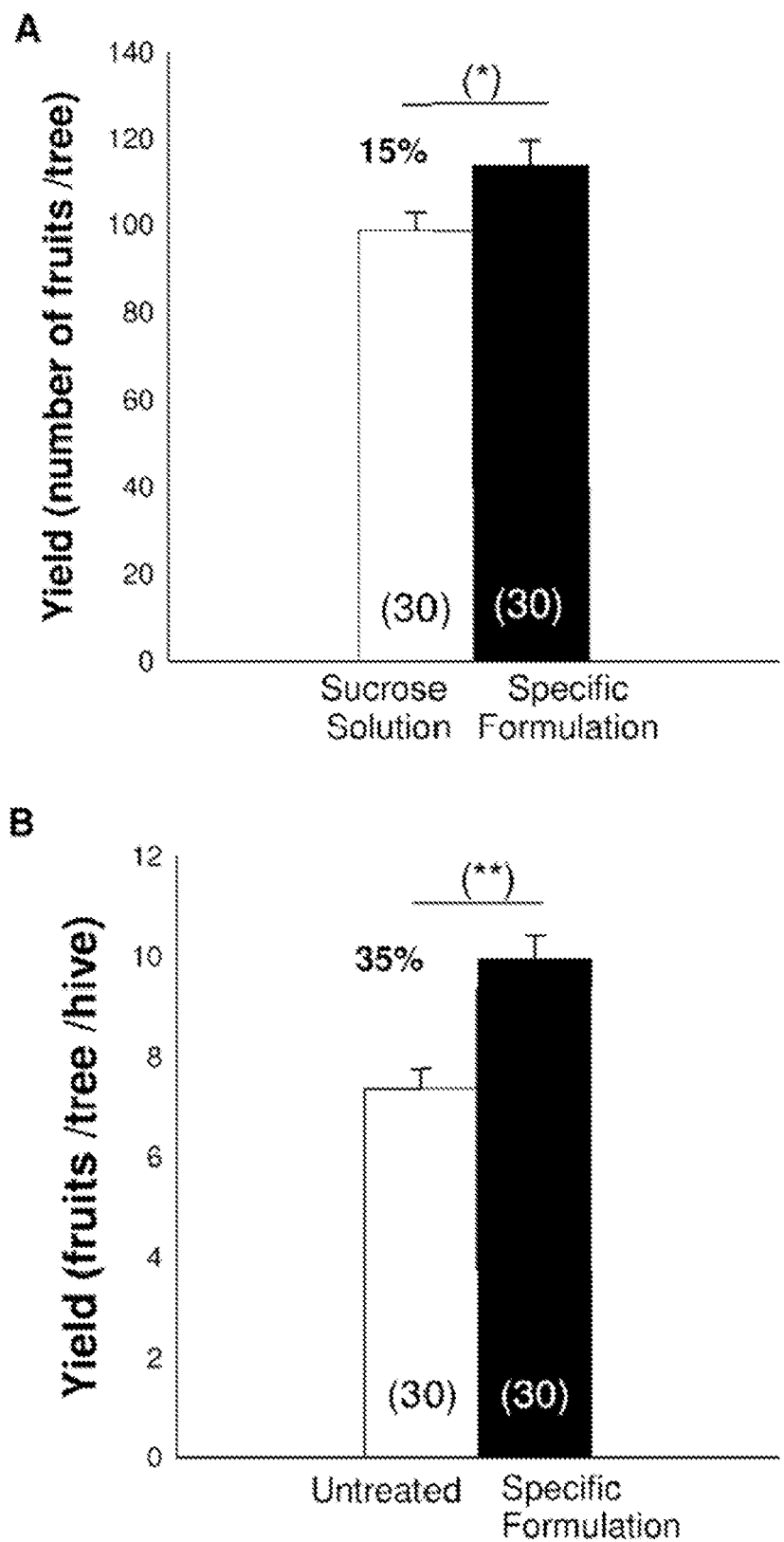
FIG. 5. Effect of the Pear Specific Formulation of the invention on the crop yield. A. Crop's Yield measured in the direct vicinity of beehives subjected to two treatments: i) Control Group, hives fed with 500 ml Sucrose Solution (white) in a single dose; ii) Treatment Group, hives fed with 500 ml Sucrose Solution with the addition of the Pear Specific Formulation of the invention (black). The main graph shows the number of fruits per tree, being the number of trees within an environment of 30 m shown in brackets. B. Number of fruits per tree analyzed in relation to the number of beehives, comparing trees in the vicinity of untreated hives with trees in the vicinity of hives treated with the Specific Formulation. Asterisks indicate significant differences, *, $p<0.05$, **, $p<0.01$ (single factor ANOVA). The percentages indicate the increase in yield of the treatment group.

Additionally, beneficial effects in the pear tree crops were confirmed. The pear three crops in the vicinity of the beehives treated with the sugar composition with Formulation III (Specific Formulation) had a higher number of fruits per tree (FIG. 5A). This higher yield is even more evident when the number of fruits per tree was analyzed in relation to the number of hives (FIG. 5B).

The invention claimed is:

1. A method for promoting targeted pollination of pear crops by honey bees, wherein the method comprises the steps of:
   a) preparing a formulation consisting of limonene, linalool and α-pinene;
   b) administering to honey bee hives a composition that comprises the formulation of step a;
   c) keeping the hives within or in the immediate vicinity of the pear crops, the pollination of which is sought to be promoted; and
   d) removing the hives.

2. The method according to claim 1, wherein the the formulation in step a consists of 21.6% to 26.4% limonene, 31.5% to 38.5% linalool, and 36.9% to 45.6% α-pinene.

3. The method according to claim 2, wherein the the formulation in step a consists of 24% limonene, 35% linalool and 41% α-pinene.

4. The method according to claim 1, wherein step b) is carried out through an artificial feeder located inside the hives.

5. The method according to claim 1, wherein step b) is carried out within 2 days before taking the hives to the crops, the pollination of which is sought to be promoted.

6. The method according to claim 1, wherein step b) is carried out after placing the hives in the crops, the pollination of which is sought to be promoted.

7. The method according to claim 6, wherein step b) is carried out before the crops' blooming level reaches 20%.

8. The method according to claim 1, wherein during step c) a second administration of the composition to the hives is carried out.

* * * * *